June 19, 1934.  W. ASTLE  1,963,519
LIQUID HANDLING APPARATUS
Filed March 18, 1931   6 Sheets-Sheet 1

INVENTOR.
William Astle
by Parker & Brocknow
ATTORNEYS.

June 19, 1934.  W. ASTLE  1,963,519
LIQUID HANDLING APPARATUS
Filed March 18, 1931    6 Sheets-Sheet 5

INVENTOR.
William Astle
by Parker & Prochnow
ATTORNEYS.

Patented June 19, 1934

1,963,519

UNITED STATES PATENT OFFICE 1,963,519

LIQUID HANDLING APPARATUS

William Astle, Little Falls, N. Y., assignor to Cherry-Burrell Corporation, Little Falls, N. Y., a corporation Application March 18, 1931, Serial No. 523,638

20 Claims. (Cl. 137—78)

This invention relates to liquid handling apparatus, and particularly to the control of the filling and emptying valves leading to a plurality of holding vats or tanks.

In the pasteurization of liquids, such as milk, the liquid or milk is first heated to a specified temperature, then held at that temperature for a specified length of time, and then cooled. According to one method of effecting such pasteurization a plurality of vats or tanks, commonly called pocket holders, are provided and the vats are filled and emptied in a desired order or sequence, one vat being emptied while another is being filled. Enough vats or holders are provided so that the liquid will be held in each pocket for a specified period, while the other vats are being emptied and refilled, which period is usually the time or period during which it is desired to hold the liquid at the pasteurizing temperature. It is also desirable for the convenience of plant operation, that there be a substantially continuous flow of the liquid to and from the apparatus in order that the holding of the liquid at the pasteurizing temperature may form a part of a continuous system of pasteurization.

An object of this invention is to provide improved means for controlling the filling and emptying of the tanks or vats.

Another object of the invention is to provide improved means for filling and emptying the vats or holders in a desired sequence; with which each holder or vat will always be completely emptied before it is refilled, regardless of the level of liquid therein; with which the possibility of a temporary short circuit of the liquid through any pocket or vat will be prevented; with which the control means for the filling and emptying mechanism may be located at a distance remote from the pocket holders or vats; with which the control of the filling and emptying of each vat will be automatic and accurate; with which the operation of the filling and emptying valves of each vat will be performed by power mechanism; with which the consumption of power will be a minimum; and with which the flow of liquid to and from the system of vats or holders will be substantially uniform and continuous.

Another object of the invention is to provide an improved apparatus for accomplishing each and all of the foregoing objects, and which will be exceptionally simple, practical, of maximum efficiency, dependable, durable and relatively inexpensive.

Various other objects and advantages will be apparent from the following description of an embodiment of the invention, and the novel features will be particularly pointed out hereinafter in connection with the appended claims.

Figures 1, 2, 14:
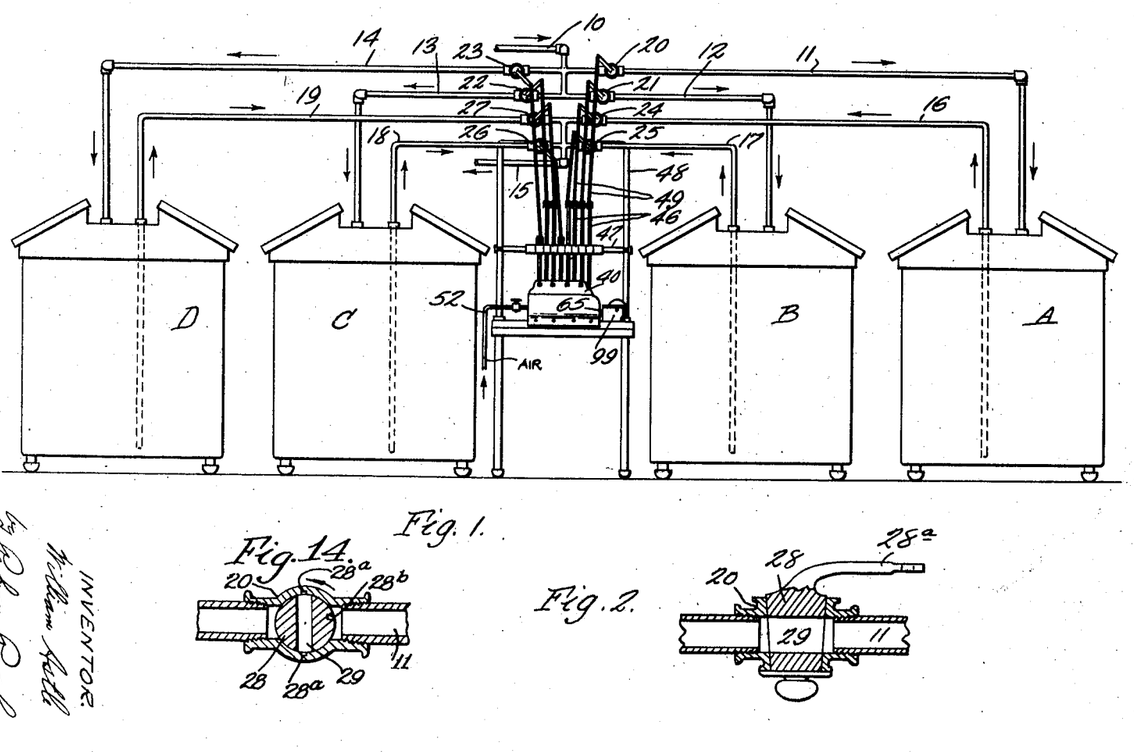
Fig. 1 is a front elevation of a pasteurizing apparatus, constructed in accordance with this invention.
Fig. 2 is a sectional plan through one of the valves of the apparatus.
Fig. 14 is a sectional plan through one of the valves 20 to 27, to show the method of venting the same.
Figures 7, 8:
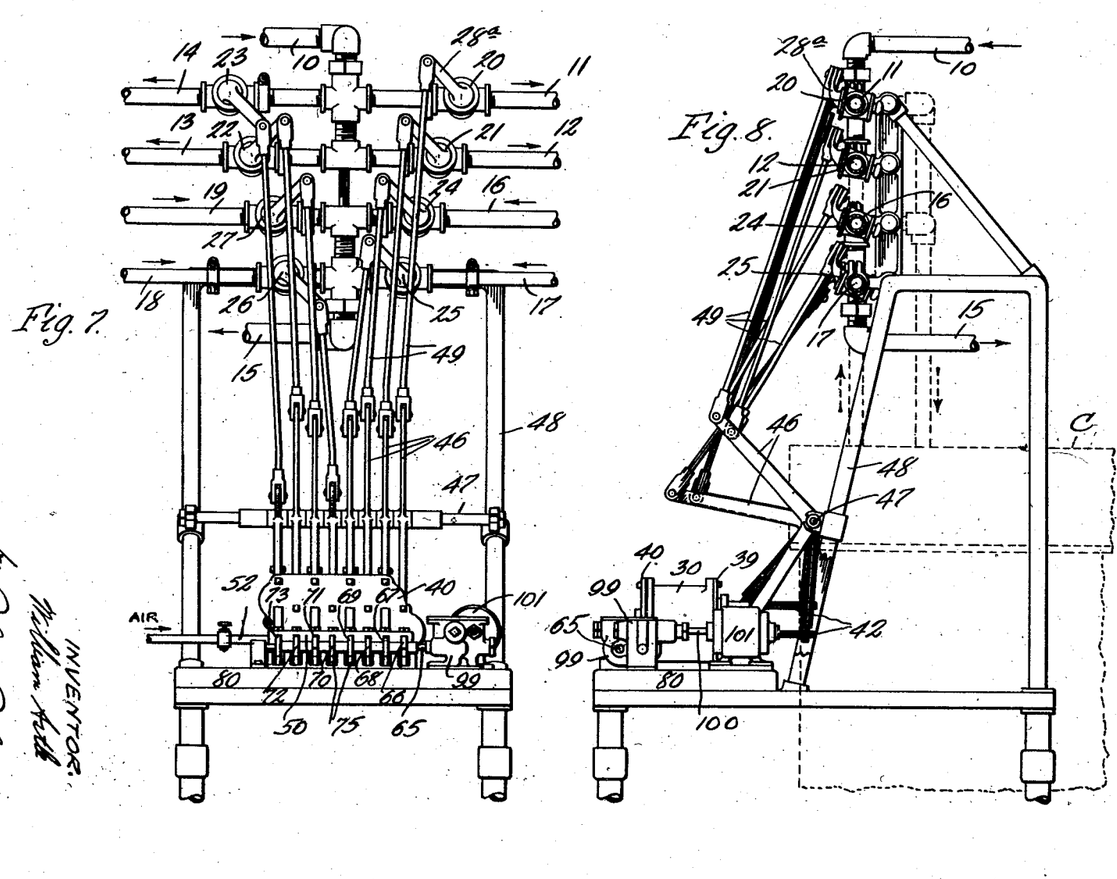
Fig. 7 is a front elevation of the valve operating mechanism of the apparatus, on a larger scale than shown in Fig. 1, so as to show certain details of construction.
Fig. 8 is a side elevation of the apparatus shown in Fig. 7.

In the illustrated embodiment of the invention, the apparatus includes a plurality of pocket holders in the nature of vats or tanks, which for convenience may be distinguished from one another by designating them A, B, C, and D, Fig. 1. A common filling pipe 10 (Figs. 1, 7 and 13) is provided with branch pipes 11, 12, 13 and 14 leading respectively to the vats, A, B, C, and D. Similarly an emptying pipe 15 is provided with branch pipes 16, 17, 18 and 19, leading respectively to the pockets or vats, A, B, C and D. The branch pipes 11, 12, 13 and 14 are provided with individual valves 20, 21, 22 and 23, respectively, and the branch pipes 16, 17, 18 and 19 are provided with individual valves 24, 25, 26 and 27, respectively. These valves are preferably arranged close to one another for convenience of operation as shown in Figs. 1, 7 and 8.

The valves 20 to 27 may be of any suitable construction, but in the illustration are of the rotary plug type, shown in Fig. 2, in which the flow through the valve casing is controlled by a rotary plug 28, having a passage 29 therethrough, and also having an operating arm 28a. These plug type valves are common in the industry and need no further description. These valves, preferably however, are of the type in which the rotary plug vents to the air or atmosphere, the passage at the side connected to a vat is closed, so that as each valve is closed, any liquid in the pipe connecting the same to a vat will enter the vat, and will not be held in the pipe until the next operation of the valve. Vented valves are well known in the industry, and require no detailed description. One of said valves is shown in Fig. 14. The tapered socket in which the valve plug rotates is provided intermediate the inlet and outlet ports with grooves 28a which run endwise of the plug and open to atmosphere so that any leakage past the plug when the plug is in closed position will drain out through the grooves 28a. The plug is also provided along one side with an endwise extending groove 28b extending from end face to end face of the plug so that when the plug is in closed position, the groove 28b will vent the pipe leading to the vat so that all liquid in the pipe leading to the vat will run into the vat. When the valve plug is turned into open position, such as by movement in the direction of the arrow in Fig. 14, the vent groove 28b will move into a position to be covered by the socket of the casing before the passage 29 establishes its communication between opposite ports of the valve and, thus, there will be no leakage through the vent groove 28b when the plug is open.

Figures 3, 4:
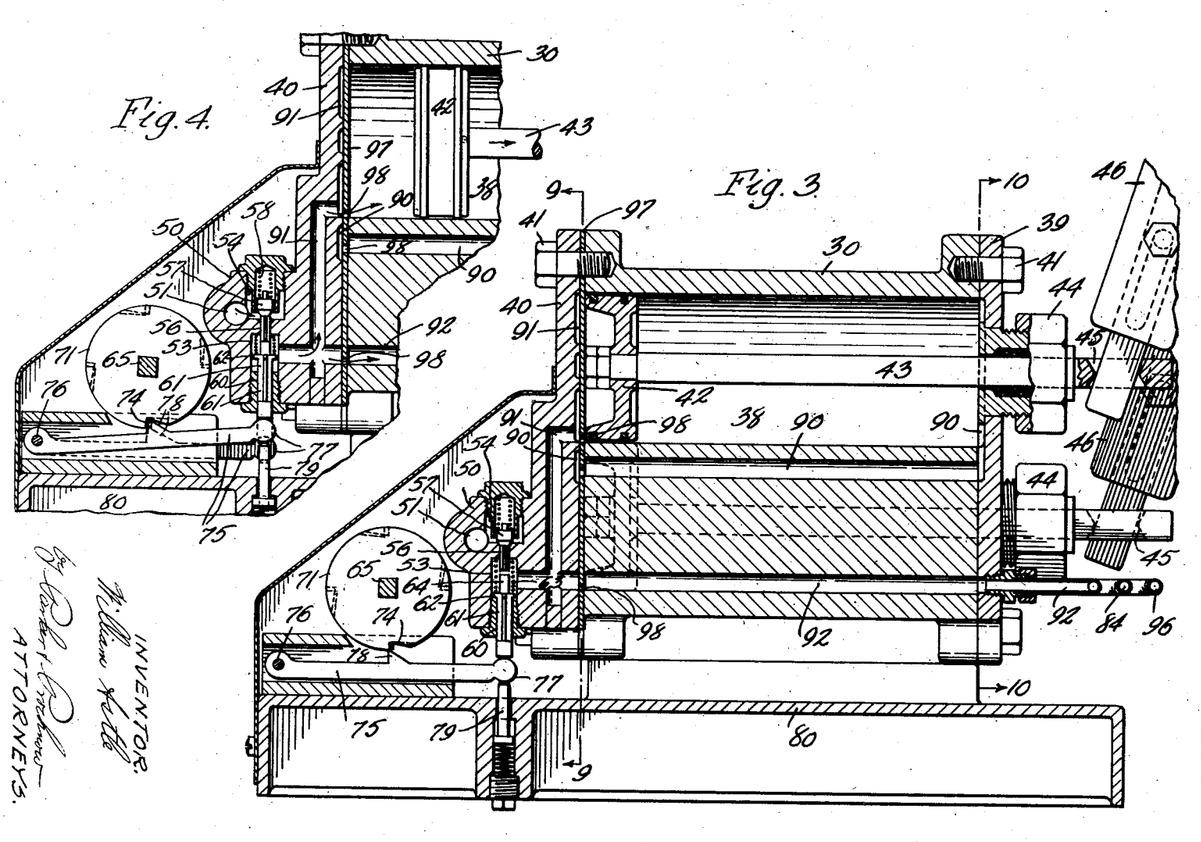
Fig. 3 is a sectional elevation of the apparatus, the section being taken approximately along the line 3—3, Fig. 9.
Fig. 4 is a similar sectional elevation of a part of the same, but with certain parts in different operative positions.
Figures 5, 6:
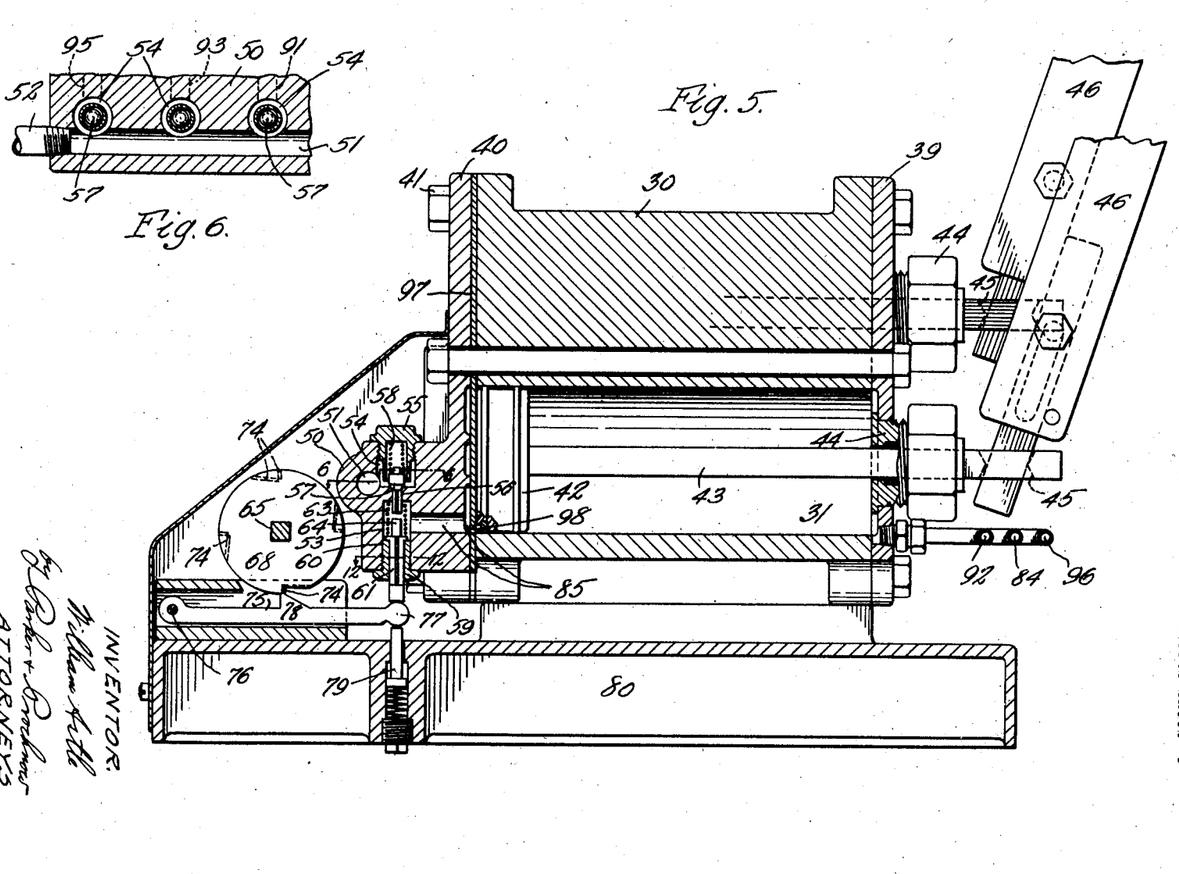
Fig. 5 is a sectional elevation of another part of the apparatus, the section being taken approximately along the line 5—5 of Fig. 9.
Fig. 6 is a sectional plan through part of the apparatus, the section being taken approximately along the line 6—6 of Fig. 5.

Fluid actuated motors are provided for operating the valves, there being an individual motor connected to and operating each valve. For convenience, the motors are incorporated in a compact form, and to this end a casting or block 30, Figs. 3, 4 and 5, is provided with a plurality of parallel, cylindrical bores 31 to 38 (Fig. 13) extending from face to face and arranged in a slightly staggered relation and in two superposed rows. The rear end or face of the block 30 is covered by a plate 39, and the front face or end is covered by a plate 40, these plates being removably secured to the end faces of the block in any desired manner, such as by screws 41.

A piston 42 is mounted in each cylinder, for reciprocation therein, each piston having a piston rod 43 extending outwardly through a packing gland 44 in the rear plate 39. The outer end of each piston rod 43 is provided with a transversely extending aperture 45 (Figs. 3 and 5), the outer ends of which aperture diverge outwardly. A plurality of bell crank levers 46 (Figs. 7 and 8) are mounted for individual rocking movement upon a bearing spindle 47 that is mounted in a skeleton frame 48. Each bell crank lever has a depending arm which extends through one of the apertures 45 in a piston rod 43, there being one bell crank lever for each piston rod. By reason of the outwardly diverging ends of each aperture 45 the arm of the bell crank lever which enters the same may rock therein to a limited extent, without material loss in the transmission of motion between the piston rod and its bell crank lever 46.

The other arms of the bell crank levers 46 are connected to links 49 which in turn are connected to the valves in the filling and emptying branch pipes. Thus, each piston rod 43 is mechanically connected through a bell crank lever 46 and a link 49 with one of the valves in the branch filling and emptying pipes leading to the vats, so that any valve 20 to 27, inclusive, may be operated positively in both directions to open or close it by operation of the particular piston 42 which is connected thereto.

The front plate 40, which closes the forward ends of the cylinder bores 31 to 38, is provided with an enlargement 50 to provide a casing in which suitable valve mechanisms may be disposed to control the operations of the various pistons 42. The enlargement 50 (Figs. 3 to 6) is provided with a passage 51 which extends from side to side of the block. An air supply pipe 52 is connected to one end of the passage 51, so as to supply compressed air thereto, and the opposite end of the passage 51 is closed. The enlargement 50 is also provided with a plurality of individual chambers 53, one for each of the cylinder bores 31 to 38. Immediately above each chamber 53 is an auxiliary or valve chamber 54 which is in the nature of a recess or cavity extending downwardly into the enlargement from its upper face and closed at its open end by a removable plug 55.

Each chamber 53 is connected with its auxiliary chamber by a valve passage 56 having a frusto-conical or tapered seat at the junction of the passage with its related chamber 54. Each chamber 54 is in communication with the air supply passage 51, so that compressed air may pass from passage 51 into all of the chambers 54, and thence through the valve passages 56 into the chambers 53. A valve element 57 is mounted to reciprocate in each valve passage 56 and at its upper end, which is in the chamber 54, is provided with an enlarged section or head which joins the depending part in a frusto-conical or tapered area which fits the valve seat at the upper end of the valve passage 56. This valve element 57, when free, closes its valve passage and prevents the passage of compressed air from the supply passage into the related chamber 53.

The depending end of each valve element 57, which reciprocates in its valve passage 56, is fluted endwise from the frusto-conical or tapered head section to its lower end, so that when the valve element is raised in the valve passage to carry its enlargement or head away from the valve seat, compressed air may pass from air chamber 54 along the flutes and through the valve passage 56 into the associated chamber 53. A helical spring 58 is provided in each chamber 54 and compressed between the cap or plug 55 and the upper end of the valve element 57, so as to hold the valve element resiliently and yieldingly against its seat. Each plug 55 may have a cylindrical flange extending along and encircling the side of the head at the upper end of the valve element, so as to guide the valve element upwardly and downwardly.

Each chamber 53 is in the nature of a cavity extending into the enlargement 50 from the lower face thereof, and closed by a removable plug 59. Each plug 59 has a passage 60 from end to end therethrough in which a relief valve element 61 reciprocates. Each valve element 61 adjacent to its inner or upper end is provided with one or more flanges 62 which engage with the inner end of the plug 59 and limit the downward movement of the valve element. A helical spring 63 is provided in each chamber 53 and compressed between the upper end of the wall of the chamber and the flanges 62 of the valve element 61 which extends into the chamber through the plug 59. This spring yieldingly urges the relief valve element 61 into its lowermost position in which its flanges 62 engage the inner end of the plug.

A pin 64 extends upwardly from inner end of the valve element 61 and is aligned with but normally spaced slightly from the depending end of the valve element 57 which also extends into the same chamber 53. When each relief valve element 61 is raised, its pin 64 will, after a short movement, engage the related valve element 57 and elevate it so as to admit compressed air into the chamber 53. Each valve element 61 is also fluted endwise from the end within the chamber 53 to a short distance below the lower end of the plug 59 through which it passes, when the valve element is in its lowermost position as shown in Fig. 3. The remaining lower end of the valve element 61 is unfluted so as to completely close the passage 60 in which it reciprocates when the valve element is raised to carry the unfluted end into the passage 60, as shown in Fig. 4.

When each valve element 61 is in lowermost position, as shown in Fig. 3, the chamber 53 into which it extends is in communication with outside air through the fluted portion of the valve element, but as soon as that valve element is elevated sufficiently to bring the unfluted portion into the passage 60, the chamber 53 will be closed against the outside air. The proportions of the various parts of the valve element 61 are such that the unfluted lower end of the valve element 61 will be carried into the passage 60 and close it before its pin 64 engages and elevates the valve element 57 immediately above it. With this arrangement each chamber 53 always will be closed against outside air before compressed air is admitted thereto.

Extending along and adjacent the enlargement 50 is a rotating cam shaft 65, and a plurality of cams 66 to 73 are fixed on said shaft for rotation therewith. Each of the cams 66 to 73 is provided on its periphery with a notch 74 which has an abrupt shoulder at the leading edge of the notch and an inclined wall extending in a trailing direction from the notch to the periphery of the cam. The cams 66 to 73 are arranged along the cam shaft 65 in accordance with the arrangement of the chambers 53, there being one cam for each chamber 53.

A lever 75 is associated with each cam, each lever 75 being pivoted at its forward end upon a pin 76, and at its rear or free end terminates in a convex portion 77 engaging with the lower end of a valve element 61 of the associated chamber 53. Each lever 75 has a cam nose 78 which rides upon the periphery of the related cam, with the convex end 77 in operative relation to the lower end of its related valve element 61. Each lever 75 is forced against its cam by a spring pressed plunger 79 mounted in the base 80 of the block 31, and engaging the underside of the convex end 77, there being an individual plunger 79 for each lever 75.

When the notch 74 in each cam comes into alignment with the nose 78 of its related lever 75, the plunger 79 engaging with that lever 75 will shift that lever upwardly and cause successive movements of the valve elements 61 and 57. The valve elements 61 and 57 will be held in operative positions until the cam, as it continues its rotation, carries the notch beyond the nose 78, during which continued movement the inclined end of the notch in the cam will gradually force the lever 75 back into its lower position and release the valve elements 61 and 57, whereupon the springs 63 and 58 will return the valve elements 61 and 57 to their normal or lowermost positions.

A plurality of passages are provided for connecting the chambers 53 to the cylinder bores in a manner which will now be explained, having particular reference to Fig. 13. The chamber 53 which is associated with the cylinder bore 32 is connected with the forward end of that cylinder bore 32 by a passage 81, and is also connected by a passage 82 with the rear end of the cylinder bore 33. The chamber 53 which is associated with the cylinder bore 33 is connected by a passage 83 with the forward end of that bore, and by a passage 84 with the rear end of the cylinder bore 34. The chamber 53 which is associated with the cylinder bore 31, is connected by a passage 85 with the forward end of the bore 31 and by a passage 86 with the rear end of the bore 36. The chamber 53 which is associated with the bore 36 is connected by a passage 87 with the forward end of that bore, and by a passage 88 with the rear end of the bore 37.

The chamber 53 which is associated with the bore 37 is connected by passage 89 with the forward end of that bore and by a passage 90 with the rear end of the bore 38. The chamber 53 which is associated with the bore 38 is connected by a passage 91 with the forward end of that bore, and by a passage 92 with the rear end of the bore 31. The chamber 53 which is associated with the bore 34 is connected by a passage 93 with the forward end of that bore, and by a passage 94 with the rear end of the bore 35. The chamber 53 which is associated with the bore 35 is connected by a passage 95 with the forward end of that bore, and by a passage 96 with the rear end of the bore 32.

The pistons 42 which are connected to the valves 20 to 23 constitute one group which may be called the filling group, and the pistons which are connected to the valves 24 to 27 in the emptying pipes constitute another group which may, for convenience, be called the emptying group. It will be noted that the passages connecting the chambers 53 to the bores, connect to one another the bores of chambers related to pistons of the same group, because only one valve of each group is open at any one time. The various passages 81 to 96 are provided as far as possible by bores, grooves or passages in the front and rear plates 40 and 39 and in the block 30, and also by pipes shown in Fig. 3 which are connected to the back plate 39 to extend between suitable bores or passages in the rear plate 39.

Figure 9:
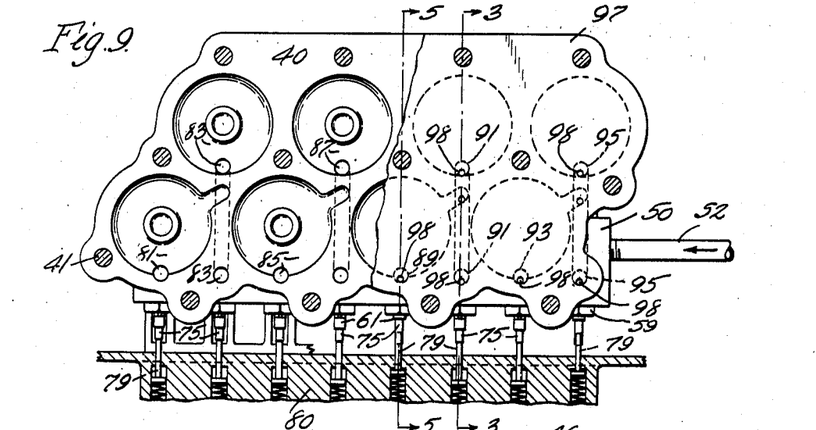
Fig. 9 is a sectional elevation of another part of the apparatus, the section being taken approximately along the line 9—9 of Fig. 3.

A thin spacer plate 97 is interposed between the front plate 40 and forward end of the block 30 to aid in the functioning of the passages connecting the bores 31 to 38 with their related chambers 53. The inner face of the front plate 40 is shown at the left hand side of Fig. 9, and as covered by the plate 97 at the right hand side of Fig. 9. The inner faces of both the front and rear plates 40 and 39, are provided with certain grooves which aid in forming the passages between the cylinders and the valve chambers 53, as shown clearly in Figs. 9 and 10, which represent sectional elevations of the inner faces of the plates. It will also be noted that the inner face of the plate 40 is covered by plate 97, as shown in Fig. 9, to aid in forming the passages which connect the cylinder bores with their related valve chambers 53.

Wherever the plate 97 crosses a passage leading to one of the cylinder bores, it is provided with an aperture 98 which is smaller in area than the equivalent area of the effective passage through each passage 60, when the relief valve elements 61 are in their lower positions. The purpose of this is to create a lesser resistance to the escape of air through the flutes in the relief valve elements 61, than through the apertures 98, and hence the fluid displaced to atmosphere by the action of any piston will not cause unintentional movement of another piston connected to the same chamber 53 through which air is being displaced to atmosphere.

The cam shaft 65 extends into a housing 99, (Figs. 7 and 8) and is driven continuously through a suitable reduction gearing contained within the housing, from the shaft 100 of a constant speed motor 101. The reduction gearing in the house 99 may be of any suitable type, and in the illustrated embodiment is of the worm screw and worm wheel type and proportioned in such relation to the speed of the motor shaft 100 that the cam shaft 65 will make one rotation per hour.

Figures 10, 11, 12:
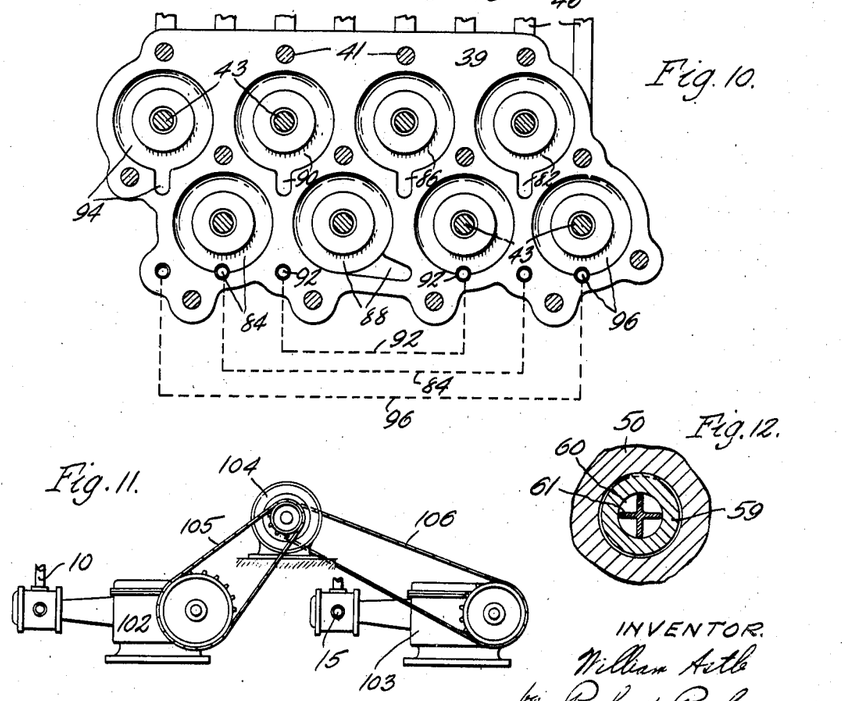
Fig. 10 is a sectional elevation of another part of the apparatus, the section being taken approximately along the line 10—10 of Fig. 3.
Fig. 11 is a schematic diagram illustrating mechanism for effecting a difference in driving ratios in the operation of the filling and emptying pumps.
Fig. 12 is a sectional plan through one of the relief valve elements, this section being taken approximately along the line 12—12 of Fig. 5 and on a larger scale.
Figure 13:
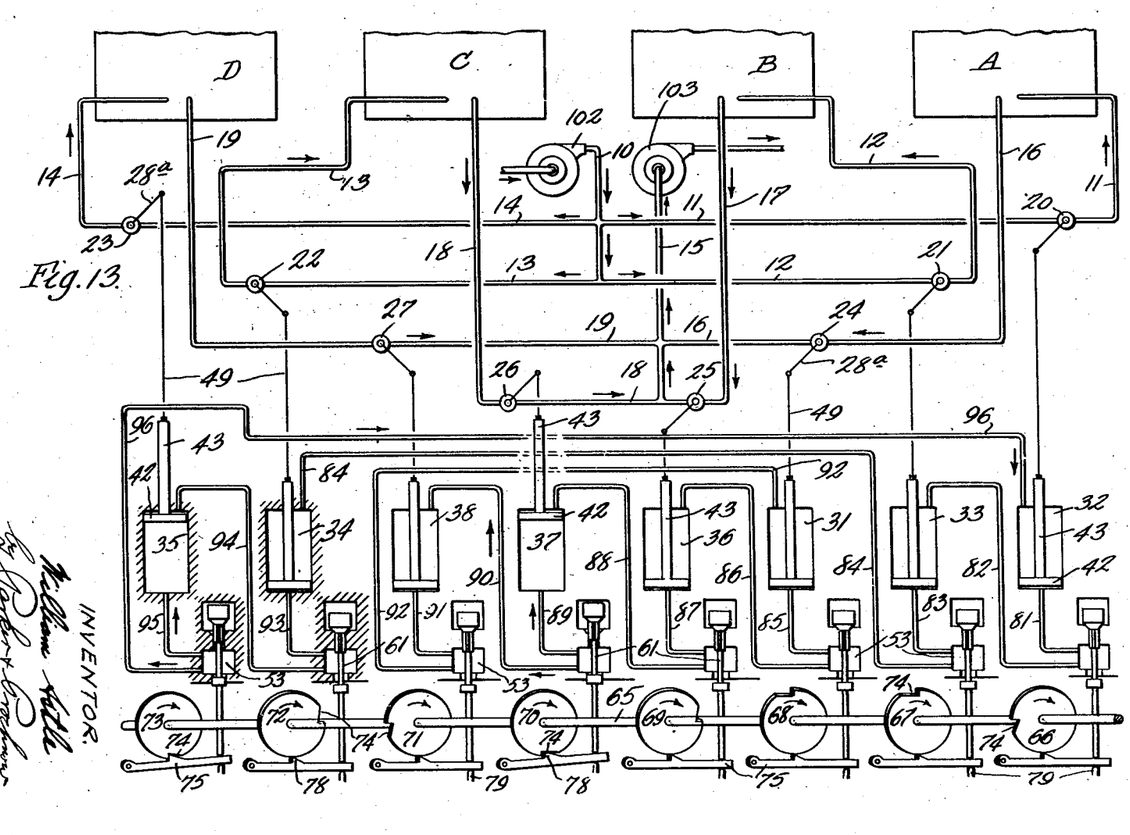
Fig. 13 is a schematic diagram of the entire system and apparatus, and illustrating the piping connections.

Referring now particularly to Figs. 11 and 13, a pump 102 is connected to the filling pipe 10 so as to deliver liquid to the different branch pipes leading to the vats, the inlet of such a pump being connected to the source of liquid to be handled, which in connection with the pasteurization of milk would be the heating device (not shown) in which the milk is brought to the pasteurizing temperature. A pump 103 is connected at its inlet end to the emptying pipe 15 and at its outlet side delivers the liquid as desired such as to a cooler (not shown) when milk is being handled.

The pumps 102 and 103 may be operated from the same motor 104 (Fig. 11) by any suitable driving connections such as by chains 105 and 106 which run over and connect sprocket wheels provided on the pump and motor shafts. In practice the emptying pump 103, which draws the liquid from the vats or holders, is set to run a little faster than the filling pump 102 or the rate of inflow, so that each pocket will be emptied and the emptying valve to that pocket closed an appreciable interval before the filling valve is opened. In practice this interval is usually about one minute.

The pumps 102 and 103 may be of any desired or suitable construction, and are shown diagrammatically in the drawings but in practice the pumps have been of the positively driven type, such as piston pumps with motor drives, the sprocket on the discharge pump, being slightly smaller than the corresponding sprocket on the inlet pump, so as to cause slightly faster operation of the emptying pump.

The operation of the apparatus will next be described. Let it be assumed that the parts are in the positions shown in Figs. 1, 3, 5, 7 and 8, and it will be noted that the valves 23 and 26 are open, with the result that the tank D is being filled and the tank C emptied. The manner in which valves 23 and 26 are opened will first be explained. The cam 70 first released its lever 75, which thereupon operated the valve device associated therewith. When this valve device was operated it first closed its vent to atmosphere by the elevation of its valve element 61 into the position shown in Fig. 4, and the upper valve element in the same valve device was then elevated to admit compressed air to the chamber 53 of that valve device. The compressed air then passed through the passage 89 to the bore 37 and caused an actuation of the piston of that bore in a rearward direction to open the valve 26, thereby connecting the emptying pump 103 to the vat C.

At the same time compressed air passed from the same chamber 53 through the passage 90 into the rear end of the bore 38, and caused actuation of the piston in that bore into its forward position, thereby causing a closing of the valve 27 leading to vat D. The emptying pump 103 was thus shut off from the vat D and connected to the vat C to start the emptying of the liquid of the vat C. During the rearward movement of the piston in bore 37, the air displaced from that bore by the movement of the piston was discharged through the passage 88 and the chamber 53 of the valve device associated with bore 36, which at that time was vented to atmosphere. Similarly the air displaced by the piston in bore 38 was discharged through passage 91 which was also vented to atmosphere at that time.

The valve device controlled by cam 73 was operated almost immediately thereafter, and thereupon the compressed air flowed from the chamber 53 of that valve device through passage 95 to the cylinder 35, and the pressure of this air forced the piston 42 of that motor endwise into the position shown in Fig. 13, during which the valve 23 was opened so as to discharge liquid from the pump 102 into the vat D. At the same time the compressed air also passed from the same chamber 53 through the passage 96 to the rear end of the cylinder bore 32, and this compressed air forced the piston of that bore back into its forward position, as shown in Fig. 13, thereby closing the valve 20 which just previously had been open during filling of the tank A.

The air displaced in the bore 35, during the movement of the piston therein into the rearward position, was forced through the passage 94 into the chamber 53 associated with the bore 34, and since that chamber 53 was vented to the atmosphere the displaced air readily escaped. At the same time the air displaced by the piston in the bore 32 escaped through passage 81 into the chamber 53 associated with that bore, and since the lower valve element in that chamber was in a position to vent the chamber to atmosphere, such displaced air also escaped freely. Since the cam 70 released its lever 75 slightly before the cam 73 released its lever, the valve 27 was closed a short interval, such as thirty seconds, before the filling valve 23 was opened under the control of the cam 73 and thereby the danger of a short circuit of liquid through the vat D was avoided. The vat D will thus be filled while the vat C is being emptied.

The cam shaft 65 continues to rotate at a definite rate, such as one revolution per hour, and the cams are arranged thereon to release their levers, approximately in pairs, at intervals of every fifteen minutes. The pumps are of such capacity that the filling or emptying of the vats is performed within this period, and the vats are emptied and then immediately refilled in succession, so that the liquid in each vat will remain undisturbed for thirty minutes at each filling.

At approximately the end of the next fifteen minute interval, the cam 69 will next release its lever 75 and cause actuation of the valve device associated therewith in a manner to close the relief from the chamber 53 of that valve device, and to admit compressed air thereto. The compressed air will then pass through the passage 87 to the forward end of the bore 36 and will cause rearward actuation of the piston in that bore, which opens the valve 25 to the vat B, to initiate the emptying of that vat, and at the same time compressed air will move through the passage 88 to the rear end of the bore 37 and will return the piston of that bore to its forward position, thereby simultaneously closing the valve 26 as the valve 25 opens. The air displaced by the pistons will escape through vented chambers 53 as explained for the other pistons. The emptying pump 103 is thus shut off from the vat C and connected to the vat B to initiate the emptying thereof.

In a short interval thereafter, such as, say thirty seconds later, the cam 72 will release its lever 75 and thus cause actuation of the valve device associated therewith. This valve device when actuated shuts off the atmospheric relief from its chamber 53, and admits compressed air thereto. This compressed air moves through passage 93 to the forward end of the bore 34 and causes rearward movement of the piston in that bore, which opens the valve 22 in the filling pipe leading to the vat C. At the same time the compressed air will move also through the passage 94 to the rear end of the bore 35 and will then return the piston of that bore to its forward position which causes a closing of the filling valve 23 concomitantly with the opening of the filling valve 22 leading to the vat C.

During the following fifteen minutes the vat B will be emptied and vat C, which during the preceding fifteen minutes had been emptied, will now be refilled. Similarly, the other cams on the cam shaft cause operation of the other valves in the desired order, the vats being emptied and immediately refilled, by which the liquid will be allowed to remain in each vat for a period of practically thirty minutes. By changing the rate of rotation of the cam shaft 65, these periods may be lengthened or shortened as desired. Since one emptying valve is opened while another is being closed, and one filling valve is closed while another is being opened, there will be practically a continuous flow of liquid through the apparatus.

It will be noted that since the emptying pump 103 is driven slightly faster than the filling pump 102, each vat will always be fully emptied during the period allowed for the emptying, regardless of the extent to which the vats are filled. If the cam shaft 65 is driven more rapidly, then the periods of filling, emptying and holding will, of course, be decreased, and the vats will not be filled to the same extent. The reverse is true if the rate of rotation of the cam shaft is decreased. The slight difference in the operation of the valve devices by the cams is clearly shown by the slight misalignment of certain of the notches of the cams in Figs. 3, 4 and 5.

If a valve device has been operated by its associated cam, such as the cam 70 in Fig. 13, the continued rotation of the cam will shortly thereafter, and before the end of the next period of fifteen minutes, cause a return of the valve device to normal position by the depression of the related lever 75, whereupon compressed air would be shut off from the chamber 53 of that valve device and that chamber connected to the atmosphere through the relief valve element 61, whereupon the air pressure in the bores 37 and 38 will immediately be released. The same release of the pressure occurs immediately following the action of each cam.

It will be obvious that various changes, in the details, which have been herein described and illustrated in order to explain the nature of the invention, may be made by those skilled in the art within the principle and scope of the invention as expressed in the appended claims.

I claim:

1. Liquid handling apparatus, comprising a plurality of holding vats, a filling pump and an emptying pump connected to each vat for filling and emptying the same, a valve controlling the connection of each pump to each vat, means for operating said valves in a desired sequence to cause the filling of one vat while another is emptied, with a desired interval between filling and emptying during which the liquid is held in the vats, the emptying pump operating at a slightly higher capacity than the filling pump which fills the vats, whereby each vat will be fully emptied before the next filling operation.

2. Liquid handling apparatus comprising a plurality of holding vats, a filling connection to each vat, a suction pump, an emptying connection between said pump and each of said vats, a valve controlling each connection to each vat, motor actuated means for operating said valves in a desired sequence, by which one vat is filled while another is emptied, with an interval between the filling and emptying and with the filling operation following the emptying of each vat immediately, said valve operating means being operable to close each emptying valve a short interval before the opening of the filling valve to the same vat, whereby a temporary short circuit through the vat is avoided.

3. A liquid handling apparatus, comprising a plurality of holding vats, filling and emptying connections to each vat, a valve controlling each connection whereby said vats may be filled or emptied in any desired sequence by manipulation of said valves in a particular sequence, a fluid operated motor for each valve having a reciprocating piston connected to that valve to operate it, a valve device associated with each motor and each having a connection to one end of one motor and another connection to the opposite end of another motor, whereby the actuation of any valve device will cause a valve opening movement of the piston of one motor and a valve closing movement of the piston of another motor connected to another valve, and means for actuating said valve devices in a desired sequence.

4. A liquid handling apparatus comprising a plurality of holding vats, filling and emptying connections to each vat, a valve controlling each connection, whereby said vats may be filled or emptied in any desired sequency by manipulation of said valves in a particular sequence, a fluid operated motor for each valve having a reciprocating piston connected to that valve to operate it, a valve device associated with each motor and each having a connection to one end of one motor and another connection to the opposite end of another motor, whereby the actuation of any valve device will cause a valve opening movement of the piston of one motor and a valve closing movement of the piston of another motor connected to another valve, each valve device having a valve element controlling the movement of an actuating fluid under pressure to the motors controlled thereby, and also having a relief valve element which relieves pressure in the connection to each motor controlled thereby, when the other valve element of that valve device is closed, and means for operating said valve devices in a desired sequence and in a manner to cause the closing of one valve element of each valve device when the other element of the same valve device opens, and vice-versa.

5. Liquid handling apparatus, comprising a plurality of holding vats, a filling pipe connected to each vat, an emptying pipe connected to each vat, a valve in each pipe, a shaft rotating at a known rate, a plurality of cams carried by and rotating with said shaft, means controlled by said cams and operating said valves in a sequence determined by said cams, whereby one vat will always be filling, another vat will always be emptying, and another vat will remain filled during a known interval depending upon the rate of operation of said shaft, the means controlled by said cams being operable by said cams in a manner to close the valve in the emptying pipe to each vat being emptied in any interval, a short period before the valve in the filling pipe to that vat is opened, whereby the possibility of a temporary short circuit of the fluid through vat being emptied, is prevented.

6. Liquid handling apparatus, comprising a plurality of holding vats, a filling pipe connected to each vat, an emptying pipe connected to each vat, a valve in each pipe, a motor for each valve, a connection between each motor and its valve, a shaft rotating at a known rate, a plurality of cams mounted on and rotated by said shaft, there being one cam for each motor, a member bearing on each cam and operated at intervals, controlled by that cam, and a motor controlling device operated by each member and causing a valve opening movement of one motor and concomitant valve closing movement of another motor.

7. Liquid handling apparatus comprising a plurality of holding vats, a filling connection to each vat, an emptying connection to each vat, a valve in each connection, a motor connected to each valve to operate it in opposite directions, a control device associated with each motor, the control device for each motor which operates a valve in a filling connection having a connection to its associated motor for causing an operation of that motor in one direction, and another connection to a motor connected to another valve in a filling connection for causing an opposite movement of the other valve, the control device associated with each motor that is connected to a valve in an emptying connection having a connection to that motor for causing operation of that motor in one direction, and another connection from the same control device to another motor which is connected to another valve in an emptying connection for causing concomitant operation of the last mentioned motor in a manner to operate its valve in the opposite direction, whereby the closing and opening of valves in the filling connections will be simultaneous, and the closing and the opening of the valves in the emptying connections will be simultaneous whereby there will be continuous filling and emptying flow.

8. A liquid handling apparatus, comprising a plurality of vats, a filling connection to each vat, an emptying connection to each vat, a valve in each of said connections, a double acting, fluid operated motor connected to each valve to operate it in both directions, the motors connected to the valves in the filling connections constituting what may be termed a filling group, and the motors connected to the valves in the emptying connections constituting what may be called an emptying group, a valve device associated with each motor, a connection from each valve device to one end of its related motor, a connection from the opposite end of each motor to the valve device of another motor of the same group, whereby when any motor is operated in one direction, another motor of that group will be operated concomitantly in the opposite direction, and means for operating said valve devices in a desired sequence.

9. A liquid handling apparatus, comprising a plurality of vats, a filling connection to each vat, an emptying connection to each vat, a valve in each of said connections, a double acting, fluid operated motor connected to each valve to operate it in both directions, the motors connected to the valves in the filling connections constituting what may be termed a filling group, and the motors connected to the valves in the emptying connections constituting what may be called an emptying group, a valve device associated with each motor, a connection from each valve device to one end of its related motor, a connection from the opposite end of each motor to the valve device of another motor of the same group, whereby when any motor is operated in one direction, another motor of that group will be operated concomitantly in the opposite direction, a source of fluid under pressure leading to each valve device, each valve device having a valve element controlling the passage of said fluid therethrough, and also another valve element operable to open to atmosphere said connections therefrom to said motors when the first valve element controlling the compressed fluid is in closed position, and to shut off communication of said connections to atmosphere when the valve element controlling the compressed fluid is open, and means for operating said valve devices in a desired sequence.

10. A liquid handling apparatus, comprising a plurality of vats, a filling connection to each vat, an emptying connection to each vat, a valve in each of said connections, a double acting, fluid operated motor connected to each valve to operate it in both directions, the motors connected to the valves in the filling connections constituting what may be termed a filling group, and the motors connected to the valves in the emptying connections constituting what may be called an emptying group, a valve device associated with each motor, a connection from each valve device to one end of its related motor, a connection from the opposite end of each motor to the valve device of another motor of the same group, whereby when any motor is operated in one direction, another motor of that group will be operated concomitantly in the opposite direction, a source of fluid under pressure leading to each valve device, each valve device having a valve element controlling the passage of said fluid therethrough, and also another valve element operable to open to atmosphere said connections therefrom to said motors when the first valve element controlling the compressed fluid is in closed position, and to shut off communication of said connections to atmosphere when the valve element controlling the compressed fluid is open, and means for operating said valve devices in a desired sequence, each connection between a motor and a valve device having a restricted passage smaller than the passage of the relief valve element, whereby the fluid displaced to atmosphere from each motor will not cause undesired movement of the other motor associated with the same valve device.

11. Liquid handling apparatus, comprising a plurality of vats, a filling connection leading to each vat, an emptying connection entering each vat, a valve in each connection, a fluid actuated, double acting, reciprocating motor connected to each valve to operate it, the motors connected to the valves in the filling connections constituting one group called the filling group, and the motors operating the valves in the emptying connections constituting another group called the emptying group, a valve device associated with each motor, each valve device having a chamber, a passage connecting said chamber to one end of its related motor, another passage connecting said chamber of the same valve device to the opposite end of another motor of the same group, a source of fluid under pressure, connected to each valve device, each valve device having a valve element connecting said source to said chamber thereof, whereby compressed fluid may be admitted to said chambers selectively and passed from said chamber to the motors to which the passages from that chamber are connected, so as to cause opposite concomitant movement of two valves in the same group, each valve device also having a relief passage extending from its chamber, and a valve element closing said relief passage, the valve elements which control the relief passages of all the valve devices being normally open, and the valve elements which control the admission of the compressed fluid to the chambers being normally closed, and means for operating said valve devices in a desired sequence.

12. Liquid handling apparatus, comprising a plurality of vats, a filling connection leading to each vat, an emptying connection entering each vat, a valve in each connection, a fluid actuated, double acting, reciprocating motor connected to each valve to operate it, the motors connected to the valves in the filling connections constituting one group called the filling group, and the motors operating the valves in the emptying connections constituting another group called the emptying group, a valve device associated with each motor, each valve device having a chamber, a passage connecting said chamber to one end of its related motor, another passage connecting said chamber of the same valve device to the opposite end of another motor of the same group, a source of fluid under pressure, connected to each valve device, each valve device having a valve element connecting said source to said chamber thereof, whereby compressed fluid may be admitted to said chambers selectively and passed from said chamber to the motors to which the passages from that chamber are connected, so as to cause opposite concomitant movement of two valves in the same group, each valve device also having a relief passage extending from its chamber, and a valve element closing said relief passage, the valve elements which control the relief passages of all the valve devices being normally open, and the valve elements which control the admission of the compressed fluid to the chambers being normally closed, means for operating said valve devices in a desired sequence in which a valve of each group is always open and the others closed, said operating means causing operation of the valve device of the emptying group a short interval prior to the operation of the valve device of a motor of the filling group, whereby the possibility of a short circuit between the filling and emptying connections to any vat will be prevented.

13. Liquid handling apparatus, comprising plurality of vats, a filling connection leading to each vat, an emptying connection entering each vat, a valve in each connection, a fluid actuated, double acting, reciprocating motor connected to each valve to operate it, the motors connected to the valves in the filling connections constituting one group called the filling group, and the motors operating the valves in the emptying connections constituting another group called the emptying group, a valve device associated with each motor, each valve device having a chamber, a passage connecting said chamber to one end of its related motor, another passage connecting said chamber of the same valve device to the opposite end of another motor of the same group, a source of fluid under pressure connected to each valve device, each valve device having a valve element connecting said source to said chamber thereof, whereby compressed fluid may be admitted to said chambers selectively and passed from said chamber to the motors to which the passages from that chamber are connected, so as to cause opposite concomitant movement of two valves in the same group, each valve device also having a relief passage extending from its chamber, and a valve element closing said relief passage, the valve elements which control the relief passages of all the valve devices being normally open, and the valve elements which control the admission of the compressed fluid to the chambers being normally closed, a cam shaft rotating at a known rate, a plurality of cams operated thereby and means controlled by said cams and in turn operating the valve devices in a desired sequence.

14. Liquid handling apparatus, comprising a plurality of vats, a filling connection leading to each vat, an emptying connection entering each vat, a valve in each connection, a fluid actuated, double acting, reciprocating motor connected to each valve to operate it, the motors connected to the valves in the filling connections constituting one group called the filling group, and the motors operating the valves in the emptying connections constituting another group called the emptying group, a valve device associated with each motor, each valve device having a chamber, a passage connecting said chamber to one end of its related motor, another passage connecting said chamber of the same valve device to the opposite end of another motor of the same group, a source of fluid under pressure connected to each valve device, each valve device having a valve element connecting said source to said chamber thereof, whereby compressed fluid may be admitted to said chambers selectively and passed from said chamber to the motors to which the passages from that chamber are connected, so as to cause opposite concomitant movement of two valves in the same group, each valve device also having a relief passage extending from its chamber, and a valve element closing said relief passage, the valve elements which control the relief passages of all the valve devices being normally open, and the valve elements which control the admission of the compressed fluid to the chambers being normally closed, a plurality of cams rotating at a known rate, means controlled by each cam and operating a valve device, whereby said valve devices will be operated in a desired sequence determined by said cams, said cams being set to cause operation of the filling and emptying valves for the same vat at approximately the same time but with the emptying valve operated a short interval before the filling valve whereby a temporary short circuit through any vat is prevented.

15. Liquid handling apparatus, comprising a plurality of vats, a filling connection leading to each vat, an emptying connection entering each vat, a valve in each connection, a fluid actuated, double acting, reciprocating motor connected to each valve to operate it, the motors connected to the valves in the filling connections constituting one group called the filling group, and the motors operating the valves in the emptying connections constituting another group called the emptying group, a valve device associated with each motor, each valve device having a chamber, a passage connecting said chamber to one end of its related motor, another passage connecting said chamber of the same valve device to the opposite end of another motor of the same group, a source of fluid under pressure, connected to each valve device, each valve device having a valve element connecting said source to said chamber thereof, whereby compressed fluid may be admitted to said chambers selectively and passed from said chamber to the motors to which the passages from that chamber are connected, so as to cause opposite concomitant movement of two valves in the same group, each valve device also having a relief passage extending from its chamber, and a valve element closing said relief passage, the valve elements which control the relief passages of all the valve devices being normally open, and the valve elements which control the admission of the compressed fluid to the chambers being normally closed, and means for operating said valve devices in a desired sequence, the operation of the valve elements of each valve device by said cams causing first the closing of the relief valve element before the opening of the valve element which admits compressed fluid.

16. A pasteurizing apparatus, comprising a plurality of holding vats, a source of hot liquid to be pasteurized, a filling connection from said source to each of said vats, a valve in each of said filling connections by operation of which the vats may be filled in any desired order, a fixed emptying connection opening into the bottom section of each vat and rising therefrom above the maximum liquid level in that vat, a valve in each of said emptying connections, located above said maximum level, and vented at the intake side when closed, whereby the valves in the emptying connections may be operated in a desired sequence, so as to empty the vats in a desired order, suction means connected continuously to all the emptying connections through the valves in those connections whereby when a valve in any emptying connection is closed, the suction at the intake side of that valve is broken, which releases any liquid in the emptying connection for return into the vat, thereby preventing leakage, through the emptying connection of any vat, of any liquid which has not been held for a desired interval of time, and means connected to all of said valves for operating them in a desired sequence by which the vats will be filled and emptied in rotation, and the liquid held in each vat a desired sequence of time, and by which the valve in the emptying connection to each vat will be closed an interval of time before the valve in the filling connection for the same vat is opened, whereby a temporary short circuit through any vat is prevented.

17. A pasteurizing apparatus, comprising a plurality of holding vats, a source of hot liquid to be pasteurized, a filling connection from said source to each of said vats, a valve in each of said filling connections by operation of which the vats may be filled in any desired order, an emptying connection opening into the bottom section of each vat and rising therefrom above the maximum liquid level in that vat, a valve in each of said emptying connections, located above said maximum level, and vented at the intake side when closed, whereby the valves in the emptying connections may be operated in a desired sequence, so as to empty the vats in a desired order, and suction means connected to all the emptying connections through the valves in those connections whereby when a valve in any emptying connection is closed, the suction at the intake side of that valve is broken, which releases any liquid in the emptying connection for return into the vat, thereby preventing leakage, through the emptying connection of any vat, of any liquid which has not been held for a desired interval of time, said suction means being of a size to empty the vats more rapidly than they are filled, whereby each vat will be fully emptied after each holding interval before being refilled.

18. A liquid handling apparatus, comprising a plurality of holding vats, means for conducting movement of a liquid to and from each of said vats, valve means controlling such movement, fluid actuated mechanism operating said valve means and including a plurality of individually operable motors, a plurality of valve devices, each connected to two different motors, a source of actuating fluid connected to each valve device, an exhaust port for each valve device, a pair of valve elements in each valve device controlling the exhaust port and the passing of actuating fluid to the motors, each valve element controlling an exhaust port being movable first into closed position and then movable further to engage and operate the valve element which controls the movement of actuating fluid through that valve device, whereby each motor will normally be vented through the exhaust ports, and the exhaust ports will be closed before the actuating fluid is admitted thereto, and means for operating the port closing valve element of each valve device when operation of that device is desired.

19. A pasteurizing apparatus, comprising a plurality of holding vats, a filling connection to each of said vats, a fixed emptying connection opening into the bottom section of each vat and rising therefrom above the maximum liquid level in that vat, a valve in each of said emptying connections, located above said maximum level, and vented when closed, whereby the valves in the emptying connections may be operated in a desired sequence, so as to empty the vats in a desired order, and suction means connected to all the emptying connections through said valves in those connections, whereby when a valve in any emptying connection is closed, the suction tending to lift liquid in that connection below that valve is broken, thereby preventing leakage, through the emptying connection of any vat, of any liquid which has not been held in that vat for a desired interval of time.

20. A pasteurizing apparatus, comprising a plurality of holding vats, a filling connection to each of said vats, a fixed emptying connection opening into the bottom section of each vat and rising therefrom above the maximum liquid level in that vat, a valve in each of said emptying connections, located above said maximum level, and vented at the intake side when closed, whereby the valves in the emptying connections may be operated in a desired sequence, so as to empty the vats in a desired order, and suction means connected to all the emptying connections through said valves in those connections, whereby when a valve in any emptying connection is closed, the suction at the intake side of that valve is broken, which releases any liquid in the emptying connection for return into the vat, thereby preventing leakage, through the emptying connection of any vat, of any liquid which has not been held for a desired interval of time.

WILLIAM ASTLE.